United States Patent [19]
Giuffre et al.

[11] 3,963,791
[45] June 15, 1976

[54] PROCESS FOR TRANSFORMING HYDROCARBON POLYMERS INTO PHOTODEGRADABLE POLYMERS

[75] Inventors: Luigi Giuffre; Italo Pasquon, both of Milan; Enrico Cernia, Rome; Vittorio Pozzi; Arthur Silvers, both of Milan, all of Italy

[73] Assignee: Snamprogetti S.p.A, San Donato Milanese, Italy

[22] Filed: Nov. 15, 1974

[21] Appl. No.: 524,310

[30] Foreign Application Priority Data
Nov. 21, 1973 Italy .................................. 31500/73

[52] U.S. Cl. ..................................... 526/22; 96/88; 96/114; 526/41; 526/42; 526/52; 526/53; 526/352; 526/914
[51] Int. Cl.$^2$ ............................................. C08F 8/30
[58] Field of Search ............... 260/94.9 GB, 93.5 A, 260/94.7 N

[56] References Cited
UNITED STATES PATENTS

| | | | |
|---|---|---|---|
| 3,583,961 | 6/1971 | Magay | 260/89.1 |
| 3,723,404 | 3/1973 | Davis et al. | 260/94.9 GB |

*Primary Examiner*—John Kight, III
*Attorney, Agent, or Firm*—Ralph M. Watson

[57] ABSTRACT

A hydrocarbon polymer, such as high density polyethylene, is rendered photodegradable through the introduction into the polymer chain of photosensitive >C=O groups by reacting the polymer with a compound such as NOCl in the heterogeneous phase in an acid environment so that —NO groups are introduced into the polymer chain which are converted into >N—OH groups and then subjecting the resultant polymer to hydrolysis so that the >N—OH groups are converted into photosensitive >C=O groups.

3 Claims, No Drawings

PROCESS FOR TRANSFORMING HYDROCARBON POLYMERS INTO PHOTODEGRADABLE POLYMERS

The present invention relates to a process for modifying hydrocarbon polymers so as to render them photodegradable in a controllable way. More particularly the present invention relates to a process for rendering polyethylene degradable under the direct action of sun light by introducing into the polymeric chain groups absorbing the radiations having a wave length in the border range between the visible and the ultraviolet such as

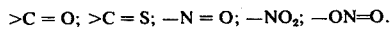

$>C = O; >C = S; -N = O; -NO_2; -ON=O.$

These groups are characterized by the presence of a single electron which may pass from a no-bond orbital n to an anti-bond orbital $\pi^*$ located over the whole group. The photolysis mechanism is the Norrish one checked on several aliphatic ketones and then also on carbonyl groups grafted onto polymeric chains.

The process of our invention has the advantage that it chemically binds the active groups to the polymers and these may be added to a manufactured article without modifying the polymerization process.

The reactions for the introduction of these groups are of the free radical type, being activated by ultraviolet radiations, electrical discharges and radicalic promoters.

According to the present invention it is possible to react NOCl, NOHSO$_4$, N$_2$O$_3$, NO and RO-NO wherein R may be an alkyl or aryl radical and a hydrogen atom is replaced by a nitrous group (—N=O).

The reaction may occur in the heterogeneous phase between the solid polymer and the reagent dissolved in a solvent or between the solid polymer and the reagent in the gaseous state at temperatures in the range of from −80°C to +100°C.

In an acid enviromnent the nitrous groups bound to primary or secondary carbon atoms are changed into oxime groups (>N—OH).

The hydrolisis of the oxime group gives rise to the desired carbonyl group (>C =O).

The nitrous groups bound to tertiary carbons too are photosensitive even if oxidised to nitro groups (—NO$_2$).

According to the present invention it is possible to modify any type of polymer by directly reacting the same with the aforesaid compounds and by following the described steps.

Sometimes, however, it is preferable to mix the hydrocarbon polymer with small amounts of a high density polyethylene previously treated as aforesaid.

Therefore a second aspect of the present invention is constituted by the possibility of obtaining hydrocarbon polymers which are photodegradable in a controllable way by mixing them with a particular additive consisting of a polyethylene modified according to the inventive reaction.

EXAMPLE 1

100 g of high density polyethylene powder, 250 ml of CCl$_4$ (analysis grade) and 1 ml of NOCl were put in a 500 ml Pyrex glass cyclindrical reactor having, in the central axis, a water circulation cooling jacket and equipped with an ultraviolet ray lamp Phillips HPK 125 W.

The environment was kept acid by bubbling anhydrous gaseous hydrochloric acid into the reaction mixture. The polymer was kept in suspension by means of a magnetic stirrer and a condenser, cooled by acetone and dry ice to prevent NOCl from evaporating. The reaction mixture was kept at room temperature.

The ultraviolet ray lamp was lighted for 5 minutes and, then, HCl and the excess of NOCl were removed by bubbling N$_2$ into the reaction mixture.

The polymer was filtered and washed with ethyl alcohol.

A refluxing hydrolisis was then carried out over one hour by using a mixture of water, ethyl alcohol and concentrated hydrochloric acid in the ratios 70/20/10.

The polymer, pressed into a film and subjected to I.R. spectrography, showed the band at 1720 cm$^{-1}$, characteristic of the carbonyl group.

The polymer was subjected to accelerated ageing tests in a Weather-O-Meter with the following results:

|   | Melt Flow Index 2.160 kg | 21.600 kg | Ratio | Yield Point | Traction Tensile Stress | Elongation % |
|---|---|---|---|---|---|---|
| A | 1.27 | 70 | 55 | 299 | 228 | 850 |
| A' | 0.23 | 28 | 120 | 302 | 199 | 783 |
| B | 1.3 | 87 | 67 | 300 | 212 | 927 |
| B' | 2.04 | 109 | 54 | — | 241 | — |

A = untreated polymer
A' = untreated polymer after 100 hours in W-O-M
B = treated polymer
B' = treated polymer after 100 hours in W-O-M

EXAMPLE 2

Use was made of the reactor of example 1: therein were introduced 10 g of low density polyethylene (Eraclene) as dust and, after the removal of air by means of a nitrogen flow, 300 ml of gaseous HCl and 0.01 mmole of NOCl. The ultraviolet ray lamp was lighted for 5 minutes and then, after the removal of the excess of HCl and NOCl be means of a nitrogen stream, the polymer was hydrolized as in example 1.

EXAMPLE 3

Use was made of the reactor described in example 1: therein were introduced 10 g of high density polyethylene (Eltex) as dust, 230 ml CCl$_4$ and 20 ml of a solution containing 1 mmole ml of N$_2$O$_3$ in CCl$_4$. The reactor was kept at a temperature of −30°C. The ultraviolet ray lamp was lighted for 5 minutes and then unreacted N$_2$O$_3$ was removed by a nitrogen stream. The whole was filtered and hydrolized according to the preceding examples.

What we claim is:

1. A process for rendering a hydrocarbon polymer photodegradable which consists in reacting the polymer with a member of the group consisting of NOCl, $NOHSO_4$, $N_2O_3$, NO and RO-NO wherein R is alkyl or aryl, in the heterogeneous phase in an acid environment and in the temperature range of from $-80°$ to $100°C$ so that —NO groups are introduced into the polymer chain which are converted into >N—OH groups, and then subjecting the resultant polymer to hydrolysis so that the >N—OH groups are converted into photosensitive >C=O groups.

2. A process for rendering a hydrocarbon polymer photodegradable as claimed in claim 1, wherein said hydrocarbon polymer is polyethylene.

3. A process for rendering a starting hydrocarbon polymer photodegradable which consists in adding to said starting hydrocarbon polymer a small amount of a high density polyethylene modified through treatment by the process claimed in claim 1.

* * * * *